United States Patent [19]
Su et al.

[11] Patent Number: 6,076,889
[45] Date of Patent: Jun. 20, 2000

[54] RECLINING CAR SEAT HINGE

[75] Inventors: Shyh-Haur Su, Kaohsiung; Chin-Huan Tseng, Hsinchu, both of Taiwan

[73] Assignee: Hornling Industrial Co., Tainan, Taiwan

[21] Appl. No.: 09/364,708

[22] Filed: Jul. 30, 1999

[51] Int. Cl.$^7$ .................................................. B60N 2/02
[52] U.S. Cl. ........................... 297/362; 475/162; 475/341
[58] Field of Search ............................ 297/362; 475/162, 475/341

[56] References Cited

U.S. PATENT DOCUMENTS

| | | | |
|---|---|---|---|
| 5,536,217 | 7/1996 | Droulon et al. | 297/362 X |
| 5,611,747 | 3/1997 | Bauer et al. | 297/362 X |
| 5,725,452 | 3/1998 | Droulon et al. | 475/162 |
| 5,871,414 | 2/1999 | Voss et al. | 475/162 X |

*Primary Examiner*—Laurie K. Cranmer

*Attorney, Agent, or Firm*—Kolisch Hartwell Dickinson McCormack & Heuser

[57] ABSTRACT

A reclining car seat hinge for a chair is disclosed. The hinge includes a pair of leaves having respective circular recesses formed with respective toothed peripheries, an annular planetary gear having a central hole defined therein and arranged in the circular recesses of the face-to-face leaves and engaged with the toothed peripheries of the recesses, a carrier ring rotatably pressed into the central hole of the annular planetary gear and having a central axis and an inner periphery coaxial with the central axis, an gear-shaft interlock arranged within the inner periphery and connected with the carrier ring in such a way that the carrier ring is movable but non-rotatable relative to the gear-shaft interlock, at least one spring having a first end connected to the carrier ring and a second end connected to the gear-shaft interlock, and a shaft extending through the leaves and non-rotatably connected to the gear-shaft interlock off center from the central axis of the carrier ring.

6 Claims, 5 Drawing Sheets

RECLINING CAR SEAT HINGE

BACKGROUND OF THE INVENTION

1. Field of the Invention

The present invention relates to a reclining car seat hinge, and more particularly to an improved car seat hinge that makes adjustment of the seatback in relation to the cushioned seat smoothly and holds the seatback stable after the adjustment.

2. Description of Related Art

Referring to FIGS. 1 and 2, a conventional relining car seat hinge includes a seat leaf (10), a seatback leaf (11) each having a circular recess (101, 111) peripherally defined therein, an annular planetary gear (12) arranged in a chamber formed by the aligned circular recesses (101, 111) of the seat leaf (10) and seatback leaf (11) and having a central hole (121) defined therein, and a shaft (13) extending through the seat leaf (10), seatback leaf (11) and having an eccentric collar (131) rotatably fit into the central hole (121) of the annular planetary gear (12).

Typically, a pair of such conventional car seat hinges are mounted on opposite sides of the car seatseat leafseatback leaf. The combined hinges are driven on either side of the shaft (13) by means of a handwheel (14) or any other driving means.

When the handwheel (14) is turned, annular planetary gear (12) travels around both the eccentric collar (131) in rotation and the shaft (13)., so as to adjust the angle of the seatback (11) with respect to the seat (10). seatback leaf.

A disadvantage of the conventional car seat hinge is that the teeth of the annular planetary gear (12) and the circular recess (111) will inevitably wear out from the friction of the annular planetary gear (12) within the circular recesses (110, 111). As a result, the hinge will not adjust the seatback (11) smoothly, and the seatback (11) will vibrate, wobble or move slightly after being secured in position.

Therefore, it is an objective of the invention to provide an improved reclining car seat hinge to mitigate and/or obviate the aforementioned problems.

SUMMARY OF THE INVENTION

The object of the present invention is to provide an improved car seat hinge that adjusts the seatback smoothly in relation to the carseat.

Another object of the present invention is to provide an improved relining car seat hinge that holds the seatback stably after the adjustment.

Other objects, advantages and novel features of the invention will become more apparent from the following detailed description when taken in conjunction will the accompanying drawings.

DETAILED DESCRIPTION OF PREFERRED EMBODIMENT

Figure 2:
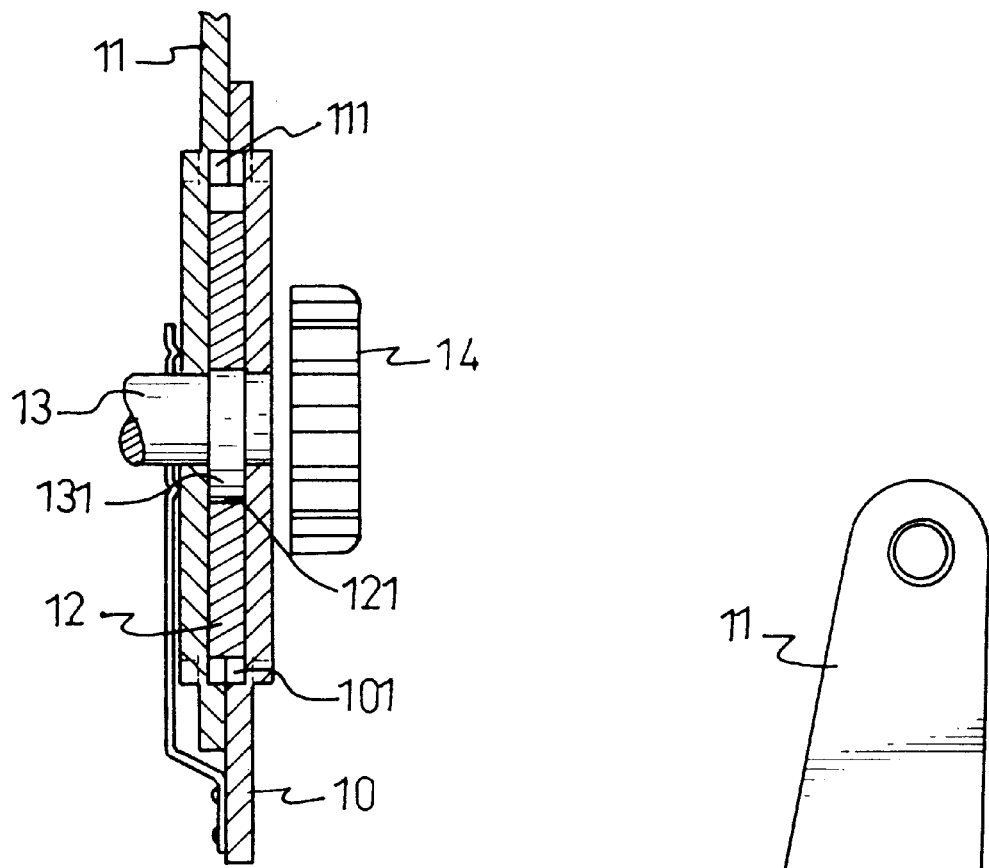
FIG. 2 is a front plan view in partial section of a conventionalhinge in FIG. 1.
Figure 1:
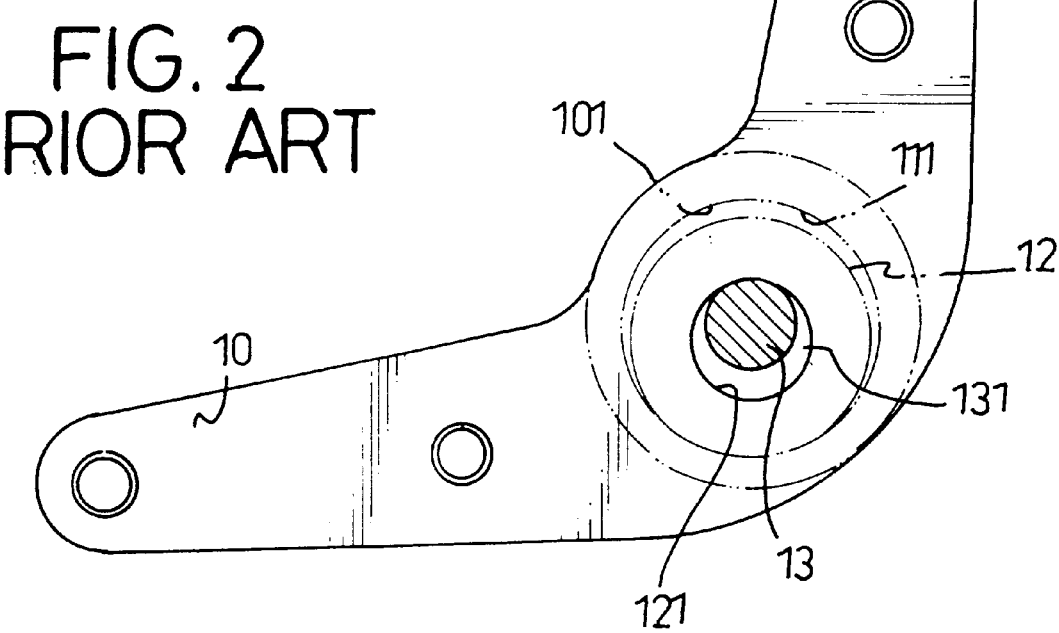
FIG. 1 is a side plan view in partial section of a conventional reclining car seat hinge.
Figure 3:
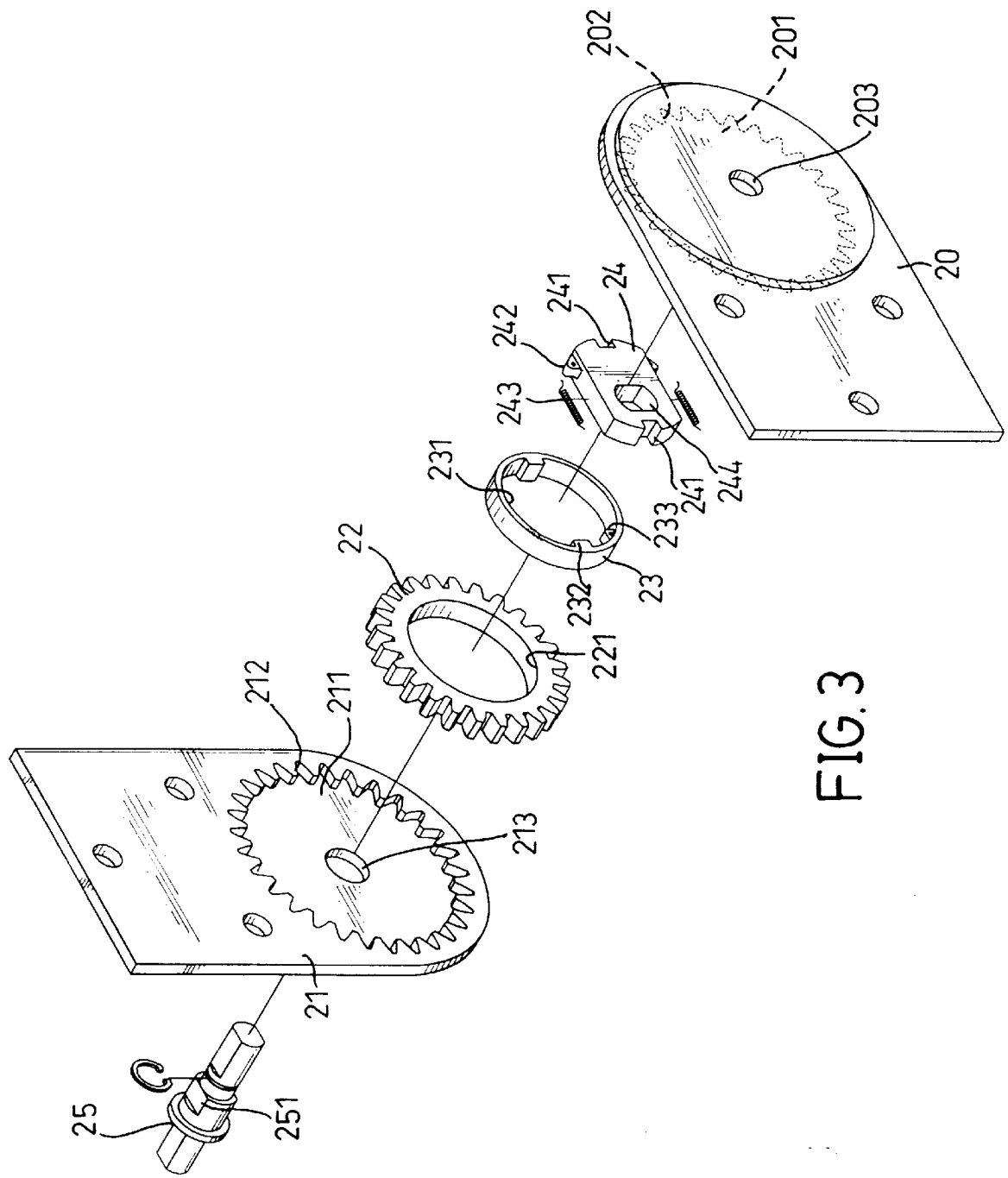
FIG. 3 is an exploded perspective view of a preferred embodiment of a car seat hinge in accordance with the present invention.
Figure 4:
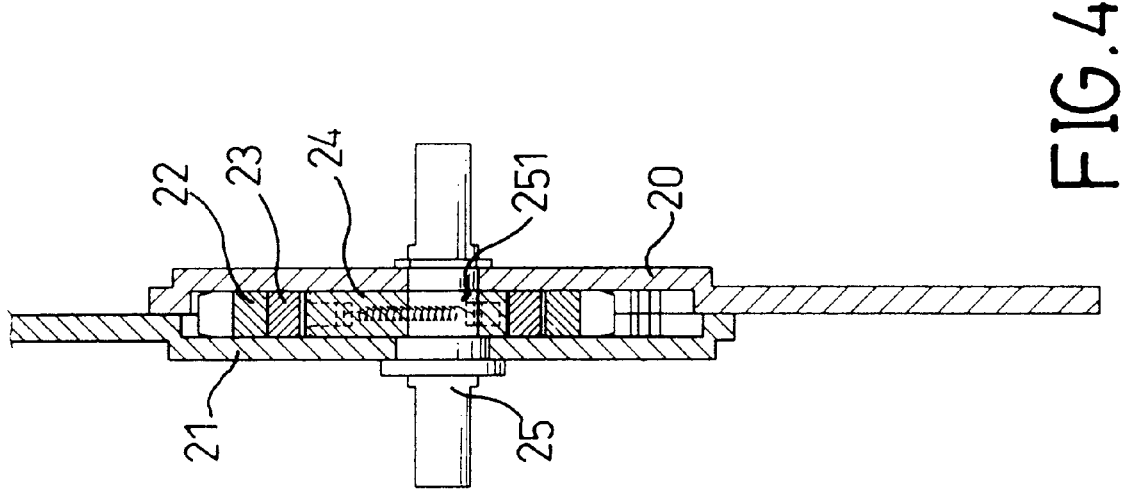
FIG. 4 is a front plan view in partial section of the reclining car seat hinge of FIG. 3.

The car seat typically has a stationary cushioned seat and a seatback capable of being inclined with respect to the seat. Referring to FIGS. 3 and 4, a reclining car seat hinge in accordance with the present invention includes a seat leaf (20) fastened to the stationary cushioned seat, a seatback leaf (21) fastened to the seatback, an annular planetary gear (22) cooperating with the leaves (20, 21), a planetary carrier ring (23) rotatably pressed into the annular planetary gear (22), an gear-shaft interlock (24) arranged in the carrier ring (23), a pair of springs (243) interconnecting the planetary carrier ring (23) and the gear-shaft interlock (24), and a shaft (25) extending through the leaves (20, 21) and securely attached to the gear-shaft interlock (24).

The seat leaf (20) has a first circular recess (201) with a first toothed inner periphery (202) and a first aperture (203) defined in the center of the face defining the circular recess (201).

The seatback leaf (21) has a second circular recess (211) with a second toothed inner periphery (212) and a second aperture (213) defined in the center of the face defining the circular recess (211). In addition, the leaves (20, 21) are engaged in such a way that the circular recesses (201, 211) have a common axis so as to define a chamber (not numbered) between the leaves (20, 21).

The planetary gear (22) is assembled in the chamber between the leaves (20, 21) and engages both of the toothed peripheries (202, 212) of the recesses (201, 211) of the leaves (20, 21). The planetary gear (22) has a central hole (221) defined therein.

The carrier ring (23) has an inner periphery (231), a pair of diametrically opposed protrusions (232) projecting from the inner periphery (231) and a pair of extensions (233) adjacent to the protrusions (232).

The gear-shaft interlock (24) with a length slightly less than the inner diameter of the carrier ring (23) is arranged within the inner periphery (231) of the ring (23). The gear-shaft interlock (24) has a keyway (241) defined at each end of the gear-shaft interlock (24) corresponding to the protrusions on the inner periphery (231) of the carrier ring (23), a pair of wings (242) formed on the sides thereof and a keyhole (244) defined to be eccentric to the centre of the planetary carrier ring (23). When the carrier ring (23) is assembled with the gear-shaft interlock (24), the protrusions (232) are movably guided in the keyways (241), thereby making the planetary carrier ring (23) movable but not rotatable relative to the gear-shaft interlock (24).

The springs (243) each have a first end connected to one of the extensions (233) of the planetary carrier ring (23) and a second end connected to one of the wings (242) of the gear-shaft interlock (24).

The shaft (25) has a key surface (251) configured to mate with the keyhole (244) of the gear-shaft interlock (24). The shaft (25) extends through the apertures (203, 213) in the leaves (20, 21), with the key surface (251) inserted through the keyhole (244) of the gear-shaft interlock (24), thereby permitting the shaft (25) to be non-rotatably connected to the gear-shaft interlock (24).

The annular planetary gear (22) may be configured as a single gear, with the first toothed periphery (202) of the first circular recess (201) of the seat leaf (20) having more teeth then the second toothed periphery (212) of the second circular recess (211) of the seatback leaf (21).

Alternatively, the annular planetary gear (22) may also be configured into a duplicate gear, with two toothed portions formed with teeth in different numbers and engaged with respective toothed peripheries (202, 212) of the circular recesses (201, 211) of the leaves (20, 21). When the annular planetary gear (22) is configured into a duplicate gear, the number of the teeth formed in the toothed peripheries (202, 212) should be the same.

The single of duplicate configuration of the planetary gear (22) is optional depending on the desired applications.

In a highly preferable embodiment, a pair of the car seat hinges in accordance with the present invention are employed on the sides of the seat. Additionally, a linking rod interconnects the shafts (25) of the hinges, with a handwheel (not shown) or electrical driving means connected to one of the shafts (25) to operate the hinges.

Figure 5:
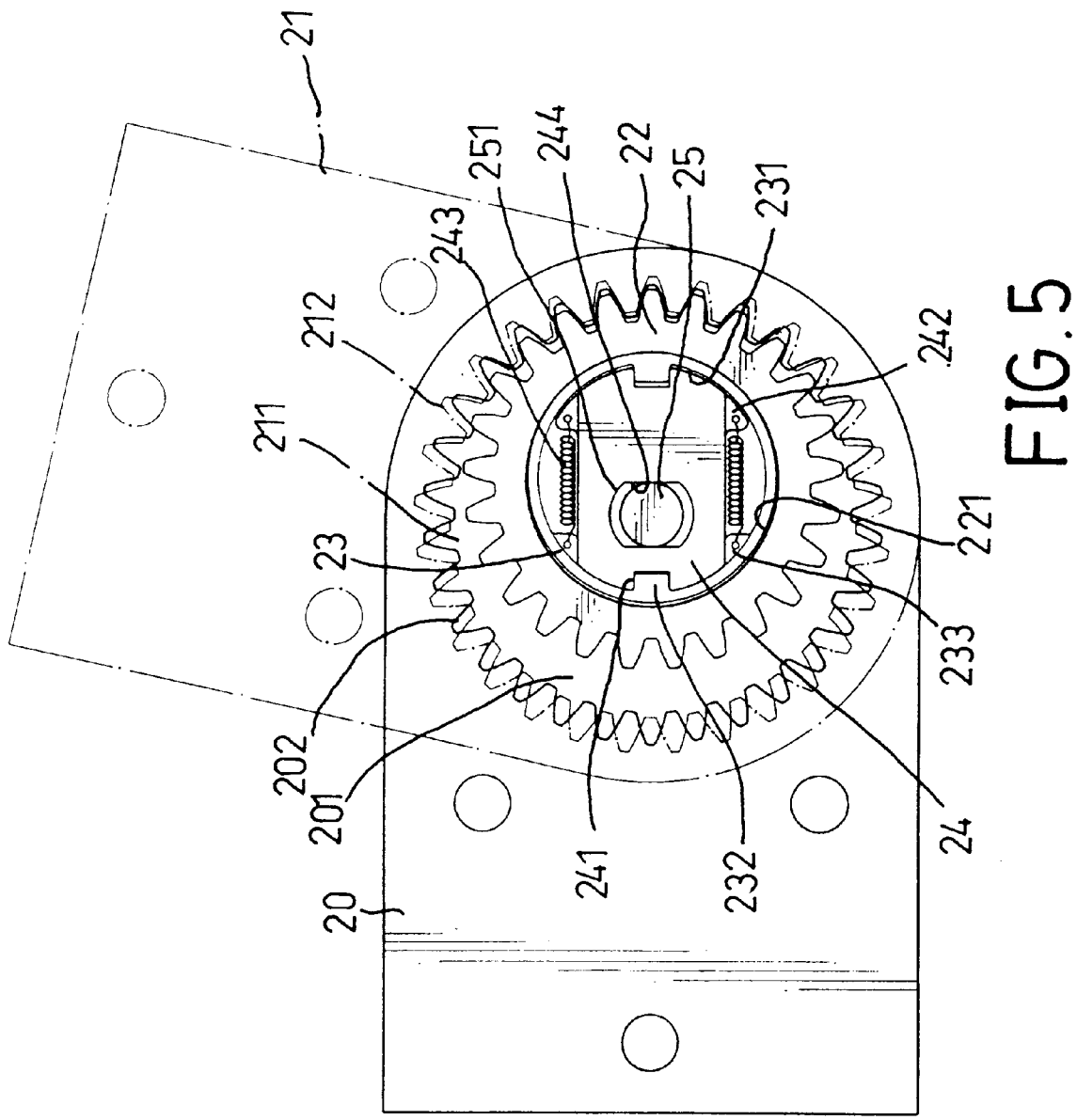
FIG. 5 is a side plan view of the reclining car seat hinge in FIG. 3 in operation.

Referring to FIG. 5, when the shaft (25) is driven by the handwheel or the electrical driving means, the gear-shaft interlock (24) is rotated, which causes the planetary carrier ring (23) to revolve around the shaft (25) due to the eccentric relationship between the ring (23) and the shaft (25).

The annular planetary gear (22), pressed around the ring (231) and engaged with the first toothed periphery (202) of the first recess (201) of the stationary seat leaf (20), is then in rotation around the central axis of the carrier ring (23) and simultaneously in revolution around the shaft (25), thereby driving the seatback leaf (21) fastened to the seat and adjusting the angle between the cushioned seat and the seatback.

Figure 6:
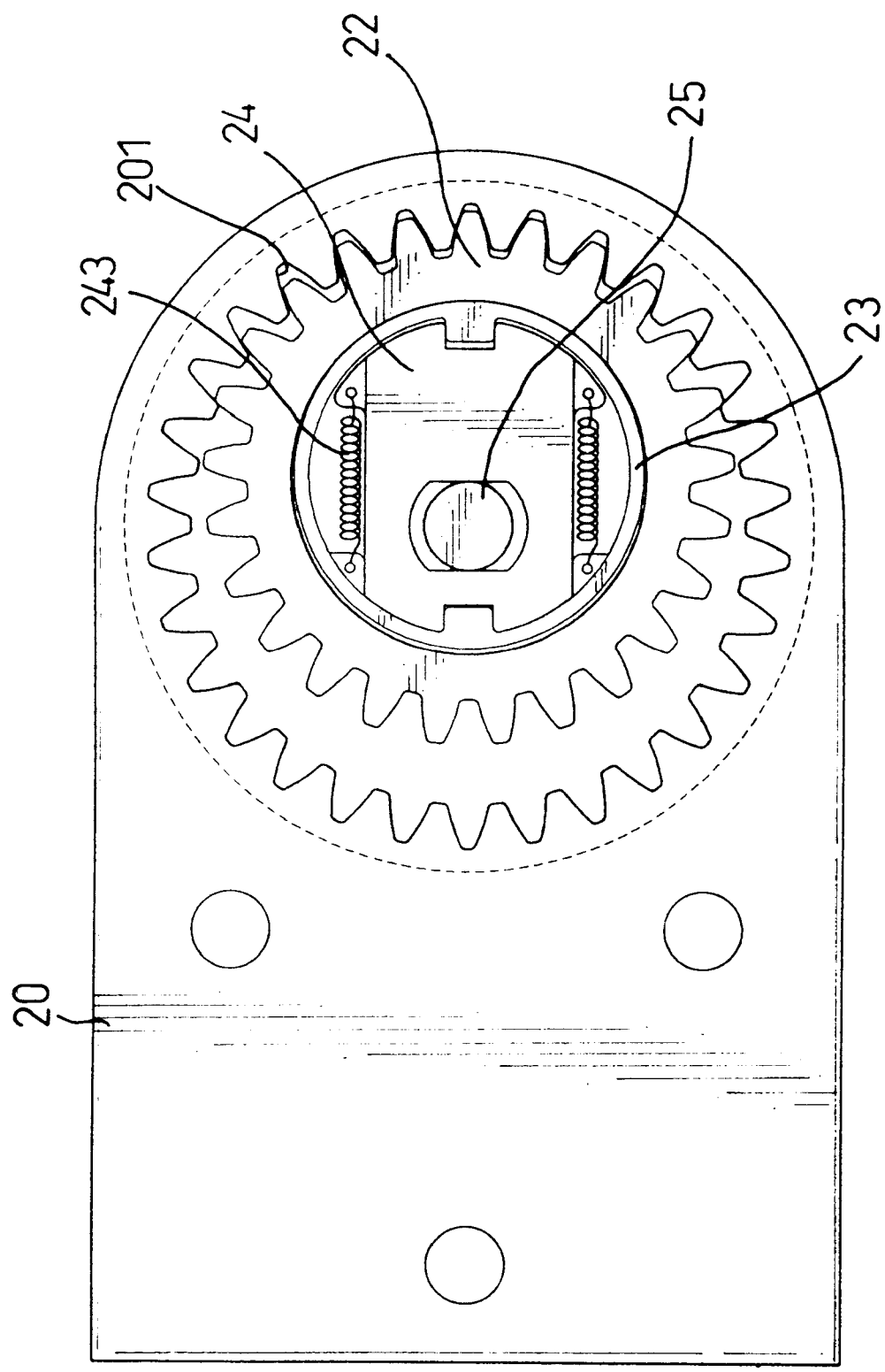
FIG. 6 is an enlarged side plan view of the reclining car seat hinge in FIG. 3.

Referring to FIG. 6, it is apparent to those skilled in the art that the clearance between the engaged teeth of the planetary gear (22) and the toothed peripheries (202, 212) of the recesses (201, 211) of the leaves (20, 21) can be eliminated by the springs (243), which urges the gear (22) towards the toothed peripheries (202, 212) by means of the relative movement of the protrusions (232) in the keyways (241) of the gear-shaft interlock (24).

From the above description, the invention has the advantages of smooth operation in the adjustment of the seatback in relation to the cushioned seat and stability of the seatback after the adjustment, even if the teeth of the annular planetary gear (22) and the toothed peripheries (202, 212) of the recesses (201, 211) in the leaves (20, 21) are worn down.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A reclining car seat hinge, comprising:
    a seat leaf (20) formed with a first circular recess (201) having a first toothed periphery (202);
    a seatback leaf (21) formed with a second circular recess (211) having a second toothed periphery (212);
    said leaves (20, 21) being engaged face to face in such a way that said circular recesses (201, 211) have a common axis to define a chamber between said leaves (20, 21);
    an annular planetary gear (22) having a central hole (221) defined therein, said planetary gear (22) being arranged in said chamber between said leaves (20, 21) and engaged with said toothed peripheries (202, 212) of said recesses (201, 211) formed in said leaves (20, 21);
    a carrier ring (23) rotatably pressed into said central hole (221) of said annular planetary gear (22), said carrier ring (23) having a central axis and an inner periphery (231) coaxial centered around said central axis;
    a gear-shaft interlock (24) arranged within said inner periphery (231) and connected with said carrier ring (23) in such a way that said carrier ring (23) is movable but not rotatable relative to said gear-shaft interlock (24);
    at least one spring (243) having a first end connected to said carrier ring (23) and a second end connected to said gear-shaft interlock (24); and
    a shaft (25) extending through said leaves (20, 21) and non-rotatably connected to said gear-shaft interlock (24) off center with said central axis of said carrier ring (23).

2. The reclining car seat hinge as claimed in claim 1, wherein said gear-shaft interlock (24) has at least one keyway (241) defined therein, and wherein said carrier ring (23) has a protrusion (232) movably guided by said keyway (241) of said gear-shaft interlock (24), thereby making said planetary carrier ring (23) movable but not rotatable relative to said gear-shaft interlock (24).

3. The reclining car seat hinge as claimed in claim 2, wherein said carrier ring (23) has an extension (233) to which said first end of a spring (243) is connected, and wherein said gear-shaft interlock (24) has a wing (242) to which said second end of said spring (243) is connected.

4. The reclining car seat hinge as claimed in claim 3, wherein said annular planetary gear (22) is configured as a single gear, and wherein said first toothed periphery (202) of said first circular recess (201) of said seat leaf (20) has more teeth than said second toothed periphery (212) of said second circular recess (211) of said seatback leaf (21).

5. The reclining car seat hinge as claimed in claim 3, wherein said annular planetary gear (22) is configured as a duplicate gear with two toothed portions formed with teeth in different numbers.

6. The reclining car seat hinge as claimed in claim 2, wherein said gear-shaft interlock (24) has a keyhole (244) defined therein, thereby permitting said shaft (25) to extend through and be non-rotatably connected to said gear-shaft interlock (24).

* * * * *